US012625028B2

(12) United States Patent　(10) Patent No.:　US 12,625,028 B2
Igorevich et al.　(45) Date of Patent:　May 12, 2026

(54) METHOD OF MONITORING OF PRESSURE AND MOISTURE CONTENT IN THE HOLLOW OF A DECOMMISSIONED PIPELINE AND DEVICE FOR IMPLEMENTATION THEREOF

(71) Applicant: PUBLICHNOE AKTSIONERNOE OBSCHESTVO "GAZPROM", Saint-Petersburg (RU)

(72) Inventors: Shiryapov Dmitriy Igorevich, Moscow (RU); Lukin Sergey Aleksandrovich, Samara (RU); Mayants Uriy Anatolievich, Moscow (RU); Alikhashkin Alexsey Sergeevich, Moscow (RU)

(73) Assignee: PUBLICHNOE AKTSIONERNOE OBSCHESTVO GAZPROM, Saint-Petersburg (RU)

( * ) Notice: Subject to any disclaimer, the term of this patent is extended or adjusted under 35 U.S.C. 154(b) by 647 days.

(21) Appl. No.: 18/011,249

(22) PCT Filed: Nov. 23, 2020

(86) PCT No.: PCT/RU2020/000626
§ 371 (c)(1),
(2) Date: Dec. 19, 2022

(87) PCT Pub. No.: WO2022/055385
PCT Pub. Date: Mar. 17, 2022

(65) Prior Publication Data
US 2023/0296467 A1　Sep. 21, 2023

(30) Foreign Application Priority Data
Sep. 9, 2020 (RU) ................................ 2020129861

(51) Int. Cl.
*G01M 3/28* (2006.01)
*G01N 31/22* (2006.01)

(52) U.S. Cl.
CPC ........ *G01M 3/2815* (2013.01); *G01N 31/222* (2013.01)

(58) Field of Classification Search
CPC .... G01N 31/222; G01N 31/21; G01M 3/2815
See application file for complete search history.

(56) References Cited

U.S. PATENT DOCUMENTS 3,475,129 A　10/1969　Peurifoy et al.
6,087,183 A　*　7/2000　Zaromb ............... G01N 1/2214
55/423

(Continued)

FOREIGN PATENT DOCUMENTS

CN　　202092924　*　12/2011
CN　　202092924 U　12/2011

(Continued)

OTHER PUBLICATIONS

International Search Report for PCT/RU2020/000626 dated Jul. 9, 2021.

(Continued)

*Primary Examiner* — Lyle Alexander
*Assistant Examiner* — Dwan A Gerido
(74) *Attorney, Agent, or Firm* — Notaro, Michalos & Zaccaria P.C.

(57) ABSTRACT

The invention relates to pipeline transportation. Technical result is represented by simplicity of implementation and increase in efficiency of monitoring of moisture content and pressure in pipeline hollows. Installation indicating cartridge filled with silica gel that allows for visual inspection of its indication, the latter is installed on the pipeline while gas circulation between the pipeline and cartridge is provided.

(Continued)

Pressure gauge is connected to the indicating cartridge, and the latter is purged with gas from the pipeline. Value of pressure in the pipeline is determined, and in case obtained results deviate from the specified value, a conclusion on the pipeline depressurization is made. Change of moisture content of gas in the pipeline is determined by indicating cartridge color change.

1 Claim, 4 Drawing Sheets

(56) References Cited

U.S. PATENT DOCUMENTS

| | | | | |
|---|---|---|---|---|
| 2003/0097100 A1* | 5/2003 | Watson | ................... | A61M 1/60 |
| | | | | 604/323 |
| 2011/0025511 A1* | 2/2011 | Wien | .................. | G01M 3/2815 |
| | | | | 73/40.5 R |

FOREIGN PATENT DOCUMENTS

| | | |
|---|---|---|
| CN | 207502492 | 6/2018 |
| RU | 2352005 C1 | 4/2009 |
| RU | 113357 U1 | 2/2012 |
| RU | 2629743 C1 | 8/2017 |

OTHER PUBLICATIONS

Written Opinion of the International Searching Authority for PCT/RU2020/000626 dated Jul. 9, 2021.

* cited by examiner

METHOD OF MONITORING OF PRESSURE AND MOISTURE CONTENT IN THE HOLLOW OF A DECOMMISSIONED PIPELINE AND DEVICE FOR IMPLEMENTATION THEREOF

This group of inventions relates to the field of pipeline transportation and can be used in preserving pipelines or other confined process equipment.

Pipeline preservation is required in case commissioning of a repaired or newly built pipeline is postponed for a longer period of time or prior to disposal of this pipeline. Within this preservation period, it is necessary to carry out periodical monitoring to demonstrate pipeline tightness and initial moisture content in its hollow.

For the purpose of preservation, pipelines are filled with dry inert gas until gauge pressure is achieved. Main parameter to be controlled during monitoring of a preserved pipeline is the value of pressure in the pipeline hollow.

One more controlled parameter is moisture content in the pipeline hollow. Inert gas used for preservation shall be dried to a specific value of moisture content increase in which detected in the course of monitoring demonstrates either water ingress into the pipeline caused by its depressurization, or poor drying of the hollow thereof prior to preservation.

There is a known method of determination of aqueous vapor content and moisture dew point (GOST 20060-83. Natural combustible gases. Methods for determining water vapour content and dew-point of moisture, p. 2-4) that includes measurement of equilibrium temperature between formation and evaporation of dew on the surface of a metal mirror in contact with the gas being analyzed. Device with which this method is implemented is represented by a dew point hygrometer. Samples are taken by connecting the device with the source of analyzed gas.

Disadvantage of said method is represented by necessity to direct the flow of test gas to the device measuring chamber during measurement with flow rate of 1-3 dm$^3$/min, and to maintain said flow rate for at least 15 minutes. Gas sampling with specified parameters from a preserved pipeline hollow can be carried out by opening stop valves, for example, on a gauge nozzle, gas sampling riser or a vent stack which, however, results in loss of gas used for preservation and, accordingly, in reduction of pressure in the preserved pipeline. Moreover, implementation of the known method provides for determination of only one parameter in the process of monitoring (moisture content).

There is a known method of determination of aqueous vapor content and moisture dew point (GOST 20060-83. Natural combustible gases. Methods for determining water vapour content and dew-point of moisture, p. 7-12) that includes adsorption of water vapors by anhydrous diethylene glycol and further determination of water bound with diethylene glycol using Karl Fischer titration or gas chromatography methods. Disadvantage of this known method is represented by labor-intensive technology of measurement which is hard to implement in case of continuous monitoring at a main pipeline run, in particular, due to significant time consumption.

Closest analogous solution (prototype) of the provided method is the method of maintenance of moisture condition in the inner hollow of a transported article (patent of the Russian Federation No. 2629743, B65D 88/38 published on 31 Aug. 2017) where moisture condition maintenance is provided by means of moisture adsorption from air using silica gel placed in a drying unit linked to the transported article hollow with an air duct. Prior to this, a transforming bladder with gauge pressure is placed in the hollow of the transformed article. Disadvantage of this known method is that it can be used to monitor and maintain required moisture content in the article hollow volume of which equals several tens of cubic meters, and it cannot be implemented in cross-country main pipelines (with diameter up to 1,420 mm) due to limited moisture storage capacity of available silica gel stock and its incapability to dry remote pipeline sections. Because of the same reasons, the known method cannot be implemented during monitoring of a preserved pipeline for a long period of time (up to three years). Moreover, it is impossible to use transforming pressurized bladder in the main pipeline hollow that has large linear dimensions.

There is a known device for implementation of the method for control of tightness of atomic marine plant steam generators with pressurized water coolant (patent No. 2352005, G21C 17/022 published on 10 Apr. 2009) where atmospheric moisture sampling from the steam generator pipeline system is carried out by blowing air through a desiccant. To determine the tritium content in the steam generator pipeline system air, the method of adsorption atmospheric moisture sampling is used. Indicating silica gel placed in a transparent bolster made of organic glass is used as a moisture adsorbent. After sampling, moisture is extracted from silica gel by vacuum thermal desorption. Tritium activity is measured in obtained moisture using a radiometer. In case tritium content in air exceeds the measurement technique error, a conclusion on depressurization shall be made.

Disadvantage of the known device is represented by high labor intensity and duration of the moisture content determination process, since system tightness is determined by tritium content magnitude. Moreover, said device does not allow pressure in the subject hollow to be monitored simultaneously with moisture content.

Closest analogous solution (prototype) of the provided device is a plant for monitoring of tightness and drying of the device with pressure control and gas treatment unit (patent of the Russian Federation No. 113357, GO1M 3/02 published on 10 Feb. 2012) that comprises a compressed gas source, pipeline, discharge gas pressure control and a gas pressure indicator connected with each other in series. Said gas treatment unit is installed at the compressed gas source outlet in the form of a removable box with a hollow, inlet and outlet ports and filtering and drying elements, as well as a central bowl with a header cavity, inlet ports on the generatrix and outlet ports in the end surface—each installed in this box with a gap between each other.

Disadvantage of the known plant is its unsuitability for monitoring of a preserved pipeline during a long period of time (up to three years), since said plant is designed for monitoring of tightness and provision of preset moisture content level in the device cavity for a short period of time during leak testing thereof equal to 30-50 minutes which does not allow for tracking of moisture content in a medium inside the preserved pipeline hollow over time. Moreover, the plant is unsuitable for monitoring of parameters in the hollows of extended objects, in particular, in main pipelines where monitoring of tightness and moisture content in various points over their length at distance of tens of kilometers between each other is required.

Problem to be solved using the provided group of inventions resides in development of a simple and efficient method and device for monitoring of pressure and moisture content in hollows of extended objects during a long period of time.

Technical result at achievement of which the group of inventions is aimed is ensuring simplicity of implementation and increase in monitoring efficiency by obtaining more reliable data on pressure and moisture content in a pipeline hollow, as well as by reduction of gas and pressure loss when carrying out tightness monitoring of a decommissioned pipeline.

Said technical result is achieved by means of the method of monitoring of pressure and moisture content in a hollow of a decommissioned pipeline that comprises installation of an indicating cartridge filled with silica gel that allows for visual inspection of its indication, and said indicating cartridge is installed on a decommissioned pipeline filled with gas while gas circulation between the pipeline hollow and cartridge cavity is provided. Pressure gauge is connected to the indicating cartridge, and the latter is purged with gas from the pipeline hollow. Within preset time intervals, the value of steady state pressure in the pipeline shall be determined and recorded, and in case obtained results deviate from the specified value, a conclusion on the pipeline depressurization shall be made. After this, gas moisture content change in the pipeline shall be determined by change of the indicating cartridge color according to a standard colorimetric scale, and in case the indicating cartridge color has changed for a color outside specified colorimetric scale limit, conclusion on moisture content rise in the pipeline hollow shall be made.

Device for implementation of the method of monitoring of pressure and moisture content in a hollow of a decommissioned pipeline according to the first embodiment comprises an indicating cartridge filled with silica gel, a pressure gauge, connecting fittings and stop valves, as well as two connecting pipelines one of which links the indicating cartridge to the pressure gauge, and the other is designed for connection of the indicating cartridge with a decommissioned pipeline. Indicating cartridge is made of transparent material and is fitted with a protective enclosure, and gauze elements are installed on the cartridge inlet and outlet.

Device for implementation of the method of monitoring of pressure and moisture content in a hollow of a decommissioned pipeline according to the second embodiment comprises an indicating cartridge filled with silica gel, a pressure gauge, connecting fittings and stop valves, as well as two connecting pipelines one of which links the indicating cartridge to the pressure gauge, and the other is designed for connection of the indicating cartridge with a decommissioned pipeline. Device further comprises a pipeline linked to connecting pipelines in parallel. Indicating cartridge is made of transparent material and is fitted with a protective enclosure, and gauze elements are installed on the cartridge inlet and outlet.

Silica gel (indicating silica gel) in the indicating cartridge is used to monitor relative humidity of medium in a confined space by its color change during production, storage and transportation of materials and mechanisms (GOST 8984-75. Silica gel-indicator. Specifications (with Amendments Nos. 1, 2, 3); http://air-part.ru/product/silikagel-orange-chameleon-2050).

Indicating silica gel is a silica gel treated with a special substance (cobalt salts or other) that ensures change of color depending on its water saturation which, in turn, depends on relative humidity of environment.

Figure 1:
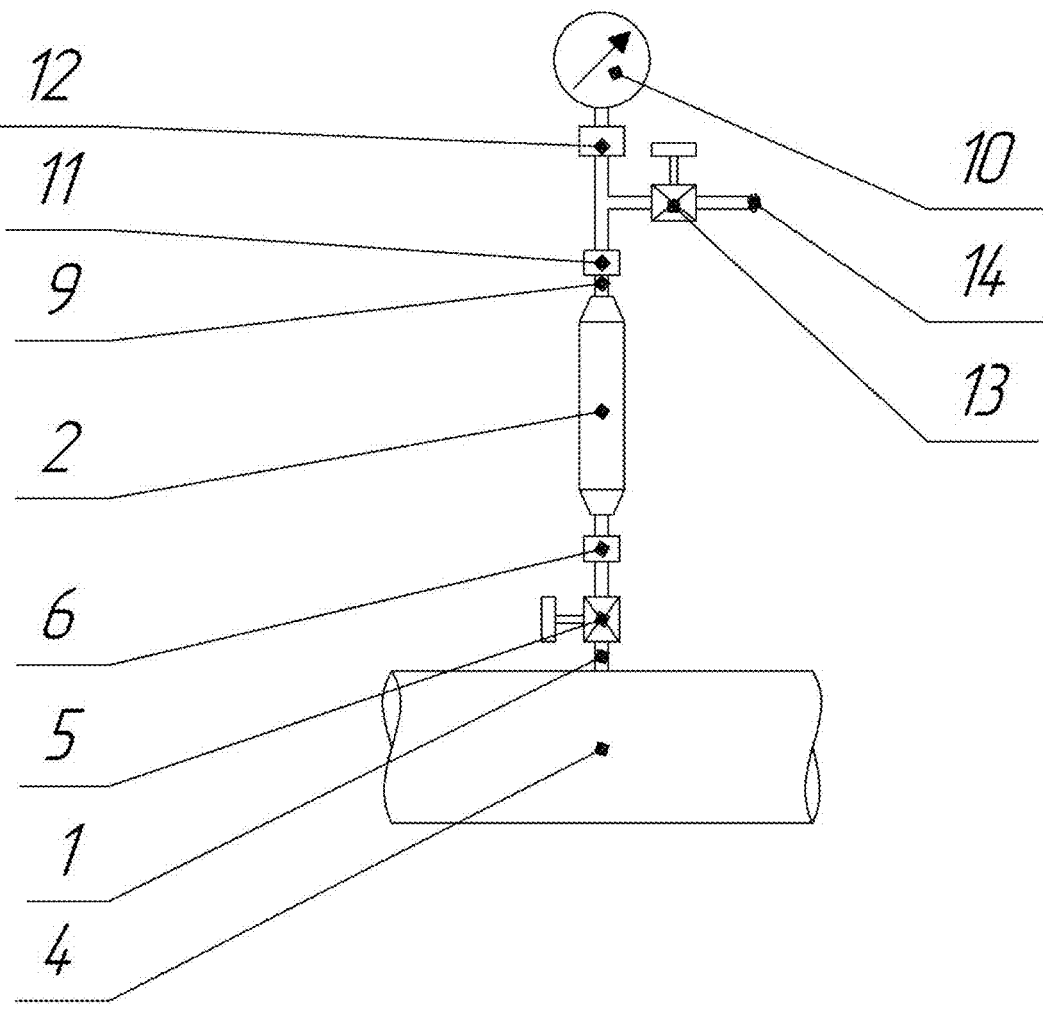
FIG. 1 illustrates the design of the device according to the first embodiment.
Figure 2:
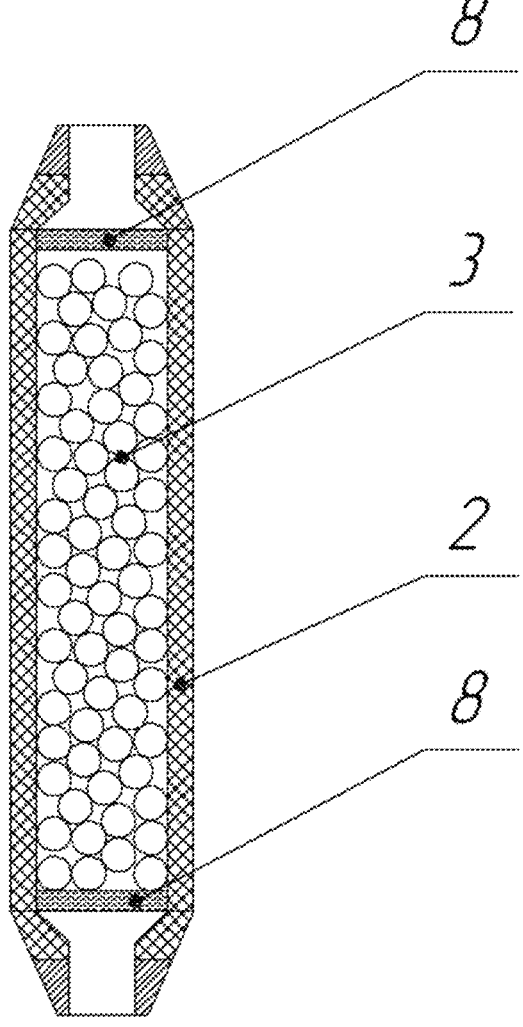
FIG. 2 illustrates the section of the indicating cartridge reflecting the particular embodiment of said cartridge.

Device for implementation of the method of monitoring of pressure and moisture content in a hollow of a decommissioned pipeline according to the first embodiment comprises pipeline 1 that connects indicating cartridge 2 made of transparent material (for example, organic glass or polycarbonate) and filled with silica gel 3 with pipeline 4 at the preservation stage. Connecting pipeline 1 is fitted with ball valve 5 that allows for connection and disconnection of the device without depressurization of preserved pipeline 4, and with detachable connecting element 6, for example, coupling nut with internal thread. Indicating cartridge 2 is fitted with protective enclosure 7 (not shown in FIG. 1) designed for protection against ultraviolet radiation and mechanical damage, and is also fitted with gauze elements 8 installed at the indicating cartridge 2 inlet and outlet that prevent pipelines from ingress of silica gel 3 particles. Pressure gauge 10 is connected with indicating cartridge 2 in series through connecting pipeline 9. Connecting pipeline 9 is fitted with connecting detachable elements 11 and 12 and ball valve 13 that is equipped with plug 14. Connecting elements 6 and 11 allow for silica gel 3 replacement, and connecting element 12 is designed for connection of pressure gauge 10.

Device for implementation of the method of monitoring of pressure and moisture content in a hollow of a decommissioned pipeline according to the second embodiment comprises pipeline 1 that connects indicating cartridge 2 made of transparent material (for example, organic glass or polycarbonate) and filled with silica gel 3 with pipeline 4 at the preservation stage. Connecting pipeline 1 is fitted with ball valve 5 that allows for connection and disconnection of the device without depressurization of preserved pipeline 4, and with detachable connecting element 6. Indicating cartridge 2 is fitted with protective enclosure 7 designed for protection against ultraviolet radiation and mechanical damage, and is also fitted with gauze elements 8 installed at the indicating cartridge 2 inlet and outlet that prevent pipelines from ingress of silica gel 3 particles. Pressure gauge 10 is connected with indicating cartridge 2 in series through connecting pipeline 9. Connecting pipeline 9 is fitted with connecting detachable elements 11 and 12 and ball valve 13 that is equipped with plug 14. Connecting elements 5 and 11 allow for silica gel 3 replacement, and connecting element 12 is designed for connection of pressure gauge 10. This device comprises additional pipeline 15 connected with pipelines 1 and 9 that together form closed circulation loop of gas between the hollow of decommissioned pipeline 4 and cavity of indicating cartridge 2. Pipeline 1 is further fitted with ball valve 16, and pipeline 9 is fitted with ball valve 17 and ball vale 18 that is equipped with plug 19.

Threshold limit values of determined parameters shall be set for decommissioned pipeline 4 as follows: minimum allowable pressure in the hollow of preserved pipeline 4 and maximum allowable color of silica gel 3 according to colorimetric scale.

Contact of silica gel 3 with wet gases during transportation and storage shall be excluded to prevent its color change.

Provided method is implemented by means of the device provided in the first embodiment on pipelines with complex geometrical arrangement or of cross-country configuration that include dead leg areas where moisture accumulation is possible, and gas transportation from said areas to a point for measuring moisture content thereof may be required as follows.

This device shall be mounted on the gauge nozzle of preserved pipeline 4 or on a welded pipe branch. Ball valve 5 shall be opened and, with ball valve 13 being closed, gas shall be transported from preserved pipeline 4 to the cavity of indicating cartridge 2 and the hollow of connecting pipeline 9. Pressure established in the hollow of pipeline 4 shall be measured using pressure gauge 10. Pressure value in the hollow of pipeline 4 shall be measured and recorded within set time intervals in the process of monitoring. In case the results obtained deviate from the specified values, conclusion on possible depressurization of preserved pipeline 4 shall be made. Then, moisture content in the hollow of preserved pipeline 4 shall be determined by visual inspection of silica gel 3 color shade; to do this, protective enclosure 7 of indicating cartridge 2 shall be removed, silica gel 3 color shall be recorded, and conformity of this color to admissible limit color shall be determined according to colorimetric scale. In case silica gel 3 color changes for the one outside the set limit according to the colorimetric scale, conclusion on unsatisfactory moisture content in the hollow of preserved pipeline 4 shall be made. In case silica gel 3 color is within the allowable interval according to the specified colorimetric scale, conclusion on satisfactory moisture content in the hollow of preserved pipeline 4 shall be made. To improve accuracy of monitoring, transportation of gas from the hollow of preserved pipeline 4 to the cavity of indicating cartridge 2 shall be carried out after each moisture content determination; to do this, plug 14 shall be removed and ball valve 13 shall be opened. In this case, gas discharge from the device to environment takes place resulting in transportation of gas from the hollow of pipeline 4 to the cavity of indicating cartridge 2. Since silica gel 3 has accumulating properties and adsorbs moisture generally contained in gas that passes through it, ball valve 13 shall be opened for a short period of time that will be enough to replace gas in the device cavity, thereby excluding possibility of pressure reduction in the hollow of pipeline 4. Upon determination of moisture content, plug 14 shall be re-installed, and indicating cartridge 2 shall be covered with enclosure 7. Device shall be left as is until next determination of pressure and moisture content in the hollow of decommissioned pipeline 4 that shall be performed according to set schedule.

Provided method is implemented by means of the device provided in the second embodiment on local pipelines or low-volume vessels where similar gas moisture content is expected in all points of the pipeline hollow, and where no transportation of gas from peripheral areas to the point of measurement is required which shall be carried out as follows.

Figure 3:
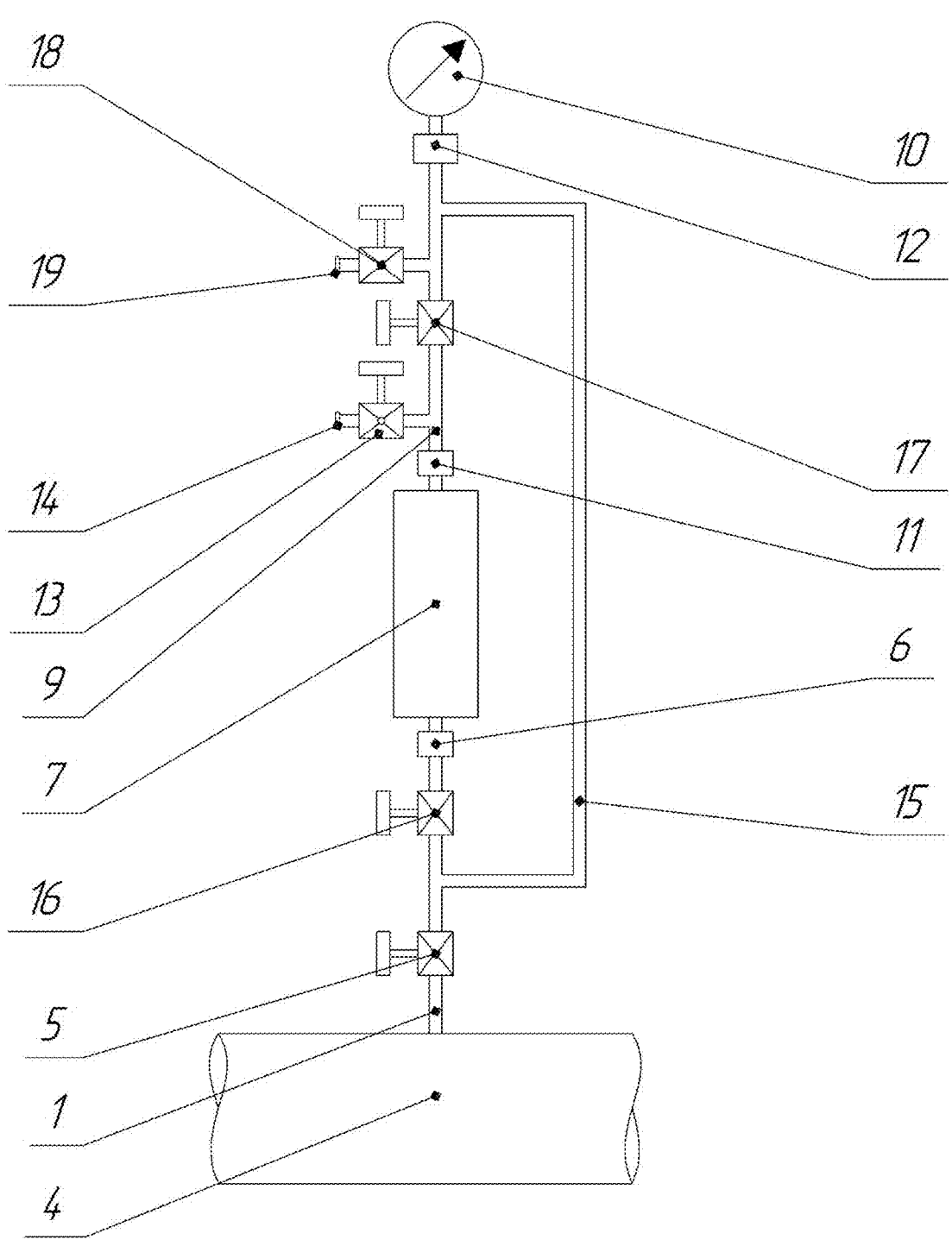
FIG. 3 illustrates the design of the device according to the second embodiment.

This device shall be mounted on the gauge nozzle of preserved pipeline 4 or on a welded pipe branch. Ball valves 5 and 16 shall be opened and, with ball valves 13, 17 and 18 being closed, gas shall be transported from preserved pipeline 4 to the cavity of indicating cartridge 2 and the hollow of connecting pipeline 15. To ensure replacement of gas in indicating cartridge 2 with gas from the hollow of pipeline 4, circulation shall be provided using reciprocating compressor (not shown in FIG. 3) connected with ball valves 13 (suction) and 18 (discharge); to do this, gas pumping out of indicating cartridge 2 shall be carried out, with valves 5, 13 and 18 being opened, by establishing underpressure therein and discharging gas through additional pipeline 15 to pipeline 4. When minimum possible pressure is established in indicating cartridge 2 valve 13 shall be closed and valve 16 shall be opened to blow another portion of gas into indicating cartridge 2 from pipeline 4. Then, valve 16 shall be closed, valve 13 shall be opened, and gas pumping out of indicating cartridge 2 shall be repeated until complete replacement of gas volume in indicating cartridge 2 is achieved (it shall be determined based on displacement volume of the reciprocating compressor).

Then, pressure established in the hollow of pipeline 4 shall be measured using pressure gauge 10. Pressure value in the hollow of pipeline 4 shall be measured within set time intervals in the process of monitoring. In case the pressure value deviates from the specified values, conclusion on possible depressurization of preserved pipeline 4 shall be made. Then, moisture content in the hollow of preserved pipeline 4 shall be determined by visual inspection of silica gel 3 color shade; to do this, protective enclosure 7 of indicating cartridge 2 shall be removed, silica gel 3 color shall be recorded, and conformity of this color to admissible limit color shall be determined according to colorimetric scale. In case silica gel 3 color changes for the one outside the set limit according to the colorimetric scale, conclusion on unsatisfactory moisture content in the hollow of preserved pipeline 4 shall be made. In case silica gel 3 color is within the allowable interval according to the specified colorimetric scale, conclusion on satisfactory moisture content in the hollow of preserved pipeline 4 shall be made. Upon completion of monitoring, ball valves 13 and 18 shall be closed, compressor shall be disconnected, and plugs 14 and 19 shall be re-installed. Indicating cartridge 2 shall be covered with protective enclosure 7. Device shall be left as is until next determination of pressure and moisture content in the hollow of decommissioned pipeline 4 that shall be performed according to set schedule.

In case pressure and moisture content values obtained in the monitoring process do not exceed specified threshold limit values, pressure and moisture content monitoring shall be repeated after a set period of time.

In case pressure reduction at stable moisture content is recorded according to the monitoring results, points of gas leakage from pipeline shall be detected using organoleptic method (by soap solution bubble test, using acoustic leak detection devices and other available methods). Upon detection and elimination of gas leakages, pressure in the pipeline shall be increased up to initial value by pumping dry gas, and gas pressure and moisture content monitoring in the pipeline hollow shall be continued after a set period of time.

In case gas moisture content in the pipeline hollow at stable pressure is determined in the monitoring process, silica gel in the gas detection tube shall be replaced with the dry (or recovered) one, and monitoring shall be repeated after a set period of time. In case moisture content rise is observed again, repeated drying in the pipeline hollow shall be carried out, and it shall be filled with dry gas until gauge pressure is established after which pressure and moisture content monitoring shall be continued. In case no repeated moisture content rise is observed, pressure and moisture content monitoring shall be continued without drying.

Figure 4:
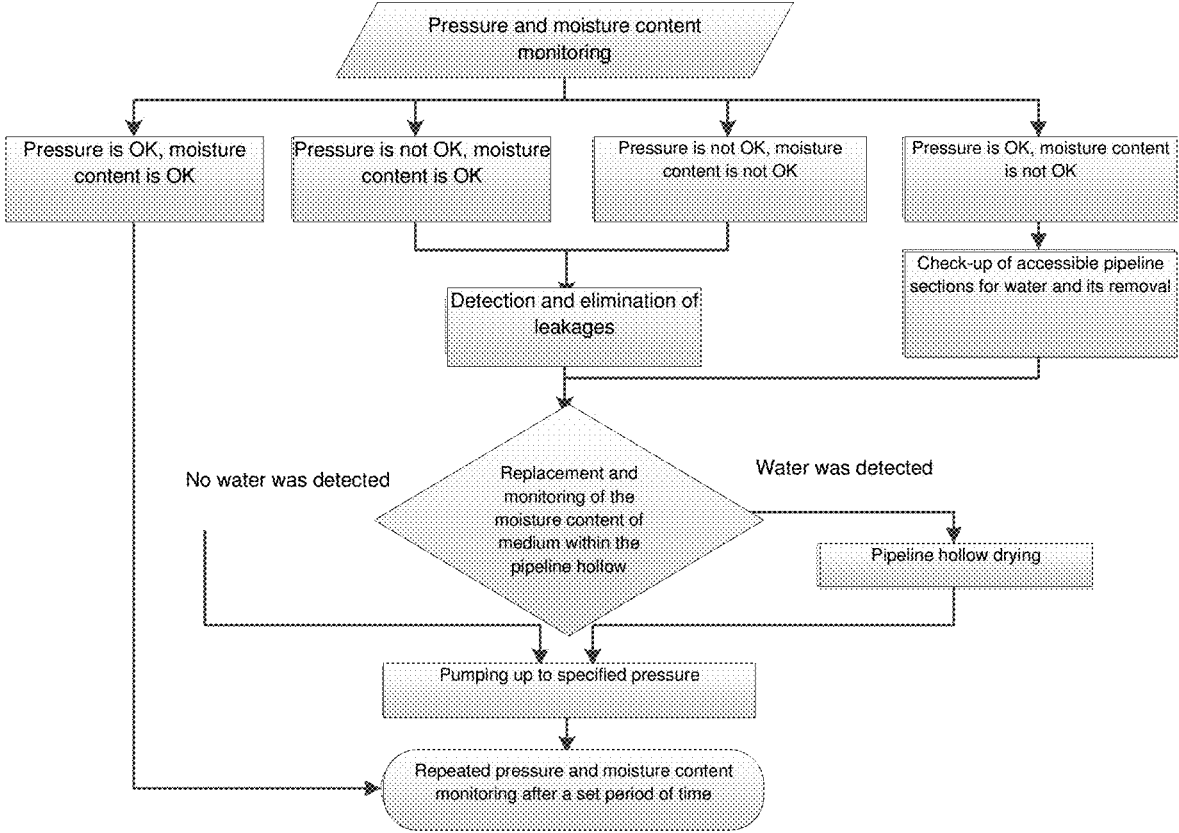

In case both pressure and moisture content values are outside specified maximum admissible values, leakage detection and tightness inspection of the pipeline, drying its hollow and filling it with dry gas until gauge pressure is established shall be carried out, and then pressure and moisture content monitoring shall be continued according to the algorithm shown in FIG. 4.

Example of the Method Implementation

Section of newly built DN 1,400 main pipeline with length of 120 km was preserved due to postponed commissioning. Pipeline hollow was filled with nitrogen with volume concentration of 98% that was dried up to the temperature of dew point by water equaling minus 20° C., with gauge pressure of 0.02 MPa. Herewith, main and bypass valves were closed at all block valve stations to isolate main pipeline sections between valve stations from each other. Devices for monitoring of pressure and moisture content in the pipeline hollow were installed on gauge nozzles at both sides of each block valve station. Periodic control of pressure and moisture content in the preserved gas pipeline hollow was carried out in the course of monitoring. During the first ten days of monitoring, control was carried out daily, then once every 15 days. Two months later, during a scheduled parameter control, pressure drop up to the atmospheric one was detected in two pressure gauges installed at both ends of the pipeline section with length of 27 km, as well as change of color of the indicating cartridge from blue to pink at one end of the section. As a result of pressure drop up to the atmospheric one, conclusion on depressurization at the pipeline section was made, and, based on indicating cartridge color change, on increase in moisture content in the pipeline section near the valve station. Nitrogen pumping in the pipeline section where pressure had dropped was performed as a corrective action. Then, leakage detection was performed at the valve station where increase in moisture content had been detected using acoustic leak detection devices and soap solution bubble test. Leakage detected at the DN 1,400 block valve stem was eliminated after which the pipeline section was purged with dry nitrogen until specified moisture content was established, and it was filled with nitrogen up to gauge pressure of 0.02 MPa. Silica gel in indicating cartridge was replaced, and monitoring of parameters in the preserved gas pipeline hollow was continued with 30-day periodicity.

By means of simultaneous comparison of obtained results by two values (pressure and moisture content), provided group of inventions allows to obtain more reliable data on a decommissioned pipeline technical condition in the process of monitoring which ensures monitoring efficiency improvement. Moreover, implementation of provided group of inventions allows for reduction of gas loss and, therefore, for prevention of pressure drop in the process of the pipeline tightness monitoring which also results in monitoring efficiency improvement.

The invention claimed is:

1. A method of monitoring pressure and moisture content in a hollow of a decommissioned pipeline comprising:

installing an indicating cartridge on a decommissioned pipeline filled with gas so that a circulation of gas between a hollow of the decommissioned pipeline and an interior cavity of the indicating cartridge is provided, wherein the indicating cartridge is formed from a transparent material and is filled in the interior cavity thereof with a silica gel, the transparent material of the indicating cartridge allowing for visual inspection of a color of the silica gel;

connecting a pressure gauge to the indicating cartridge;

purging the indicating cartridge of gas from the hollow of the decommissioned pipeline;

within preset time intervals, recording a value of a steady state pressure in the hollow of the decommissioned pipeline from the pressure gauge, wherein the preset intervals comprise daily during a first ten days of monitoring and every fifteen days after the first ten days of monitoring;

when the recorded steady state pressure deviates from a specified value by a predetermined threshold, concluding that the hollow of the decommissioned pipeline is depressurized and determining a gas moisture content change in the hollow of the decommissioned pipeline by a corresponding change in the color of silica gel in the indicating and;

when the color of the silica gel in the indicating cartridge has changed to a color outside a specified colorimetric scale limit, concluding that a moisture content in the hollow of the decommissioned pipeline exceeds a predetermined allowable moisture level.

* * * * *